United States Patent [19]

Craig et al.

[11] Patent Number: 4,561,063
[45] Date of Patent: Dec. 24, 1985

[54] APPARATUS FOR IDENTIFYING THE POSITION OF A BODY

[75] Inventors: Robert L. Craig, Glasgow; Iain Hunter, Beith; Paul D. Packard, Glasgow, all of Scotland

[73] Assignee: Barr & Stroud Limited, Glasgow, Scotland

[21] Appl. No.: 463,261

[22] Filed: Feb. 2, 1983

[30] Foreign Application Priority Data

Feb. 9, 1982 [GB] United Kingdom ............... 8203643

[51] Int. Cl.⁴ ............................................ G01B 11/00
[52] U.S. Cl. .................................. 364/559; 364/449; 358/103
[58] Field of Search ............... 364/443, 449, 456, 521, 364/559; 358/103, 107; 340/984, 985, 988, 989; 318/588

[56] References Cited

U.S. PATENT DOCUMENTS

| | | | |
|---|---|---|---|
| 4,071,895 | 1/1978 | Wood et al. | 358/103 |
| 4,138,726 | 2/1979 | Girault et al. | 364/521 |
| 4,238,828 | 12/1980 | Hay et al. | 364/559 |
| 4,240,108 | 12/1980 | Levy | 358/103 |
| 4,400,780 | 8/1983 | Nagao et al. | 364/521 |

Primary Examiner—Gary Chin
Attorney, Agent, or Firm—Mason, Fenwick & Lawrence

[57] ABSTRACT

Apparatus (10) for identifying the position of a body (21) in a scene (20) comprises a first station (11) incorporating a raster-scan imaging device (15) having a field of view (19) with azimuthal and elevational rotational freedom and variable magnification the settings of which are respectively sensed by sensors (24,25,26). A signal processor (16) collects the video signal from device (15) and the sensor signals and adds the latter to part of the raster scan which, in playback, does not obscure the video picture generated by the video signal. The processor (16) is connected by lead (28) to a second station (12) which incorporates a raster-scan playback device (32) associated with an operator-actuated electronic cursor generator (33). The cursor position as selected by the operator to designate the body (21) on the image of the scene (20) is identified by a signalling circuit 36 and fed to a computer (38) which also receives the sensor signals extracted from the processor (16) output by an extraction circuit (31). The computer (38) functions according to a predetermined algorithm to provide a read-out on device (39) of the position of the body (21).

4 Claims, 1 Drawing Figure

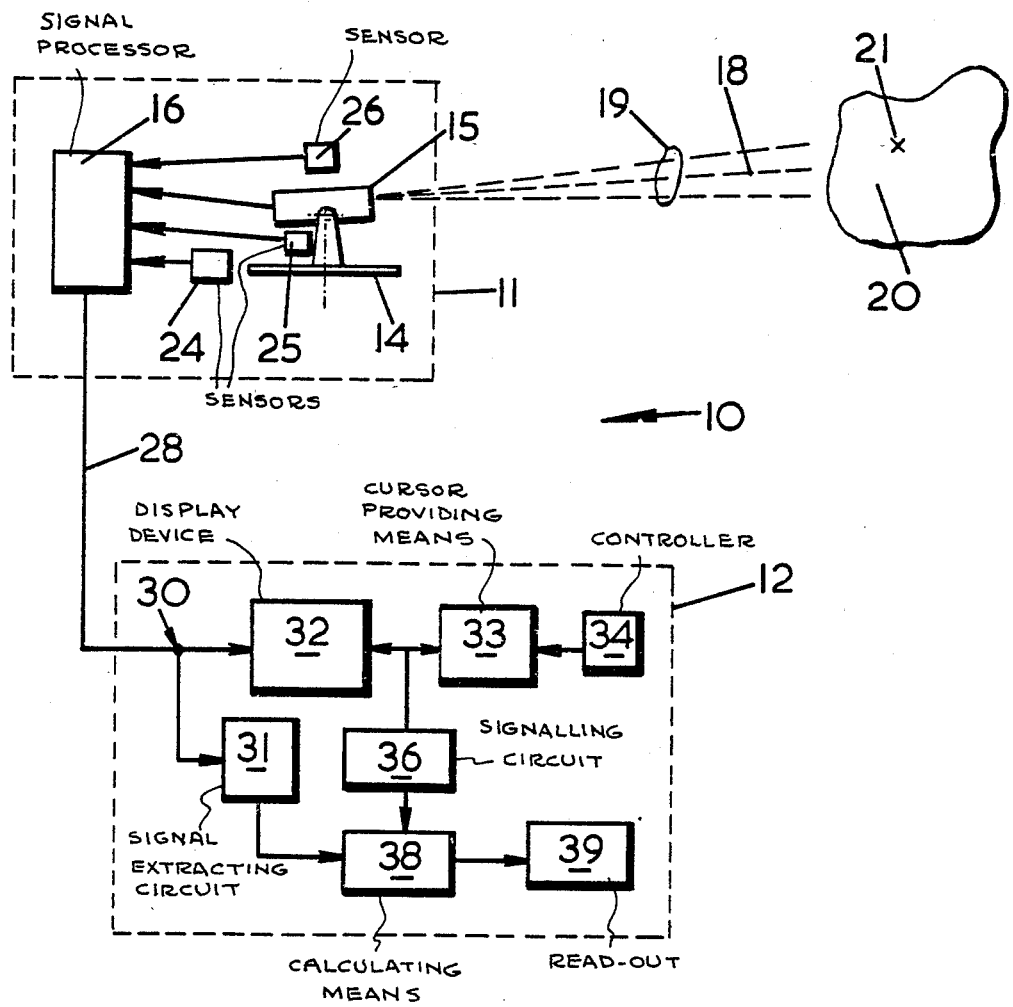

APPARATUS FOR IDENTIFYING THE POSITION OF A BODY

This invention relates to apparatus for identifying the position of a body.

In navigation equipment, such as is used in seagoing vessels, there is normally provided a sighting system which is rotatable at least in azimuth and possibly also in elevation whereby when a fixed graticule marking in the sighting system is aligned on a body the azimuthal and/or elevational position of that body can be determined from the measurement signals produced by sensors monitoring the azimuthal and/or elevational rotation of the sighting system relative to respective datum positions. Usually these measurement signals are fed to a visual display on which there is produced the numerical value of azimuthal position (bearing) and/or the elevational position for subsequent plotting on a navigational chart.

In the known equipment the sensor measurement signals are transmitted via individual electrical wires and associated slip rings, the latter being provided in order not to limit the rotational capabilities of the sighting system, which are relatively expensive to construct and instal. Furthermore in the case where the navigational equipment incorporates a periscope, as in a submarine, the space on the periscope for accommodation of the wires and slip rings is at a premium. Furthermore in the known equipment the analysis of bearing and elevation position requires to be undertaken on a real-time basis and where the equipment forms part of a submarine the periscope requires to be in an exposed position for as long as it takes an operator to effect the analysis. Under hostile conditions this is disadvantageous.

According to the present invention there is provided apparatus for identifying the position of a body comprising a first station at which there is located a raster-scan imaging device having a field of view with at least one degree of rotational freedom, sensor means for measuring the angular position of the device, a signal processor for adding the output of the sensor means to the video signal delivered by the imaging device at a position in the raster scan which, in playback, does not obscure the video picture generated by the device from radiation received by its field of view, and means for delivering the output of the signal processor to a second station;

and said second station comprises means for receiving the output of the signal processor and identifying therefrom the output of the sensor means, a raster-scan playback display device with means for providing an operator-controllable electronic cursor thereon, signalling means for identifying the cursor position with respect to the raster-scan of the playback device, and a computer for calculating from the identified output of the sensor means and the identified position of the cursor the angular position of a body identified in the field of view by location of the cursor on the playback display device.

Preferably the imaging device is provided with means for varying the sensitivity settings thereof and said sensor means also measures said sensitivity settings.

The imaging device may for example be a T.V. camera or a thermal imager and the first and second stations may operate synchronously or asynchronously in time. The means for delivering the signal processor output may comprise a signal storage means such as magnetic tape.

An embodiment of the present invention will now be described by way of example with reference to the accompanying schematic drawing.

In the drawing the apparatus 10 comprises a first station 11 and a second station 12. At station 11 there is located a support 14 carrying a raster-scan imaging device 15 the video output signal of which is delivered to a signal processor 16. The device 15 has a line of sight 18 and a field of view 19, which by way of example may be a cone of 10° cone angle, which receives radiation from a scene 20 containing a body 21 whose position is to be identified.

The field of view 19 is rotatable in azimuth by virtue of the support 14 having a rotatable mounting and a sensor 24 is provided to measure the extent of this angular movement relative to a datum, and further rotatable in elevation by virtue of device 15 having a rotatable mounting and a sensor 25 is provided to measure the extent of this angular movement relative to a datum. The device 15 may incorporate a variable magnification telescope whereby the angular extent of the field of view 19 may be varied and a sensor 26 is provided to measure the sensitivity setting of the device 15 in this respect. The device 15 may have further sensitivity controls for example for altering image resolution and if so pertaining sensors would be provided.

Each of the sensors 24, 25, 26 (together with any other sensors provided) deliver their output signals to the signal processor 16 which is arranged to add these signals to the video signal from the device 15 in a manner known per se such that the added signals are contained in those raster lines at the top and/or bottom of a frame where their presence during playback does not obscure the video picture generated by device 15 from radiation received from the scene 20.

The output of the processor 16 is made available to a delivery means 28 which in this embodiment is in the form of an electrical conductor.

The second station 12 comprises a means 30 for receiving the output of the processor 16, means 30 in this embodiment simply being in the form of a conductor terminal. To terminal means 30 there is connected a signal extracting circuit 31 for identifying the output of the various sensors 24, 25, 26 etc. and a raster-scan playback display device 32 to which there is connected a means 33 for providing an electronic cursor which is movable over the display device 32 by operator action of a controller 34. A signalling circuit 36 is connected to the device 32 for identifying the position of the cursor with respect to the raster-scan of the device 32 and the outputs of circuits 31 and 36 are delivered to a computer 38 which is programmed as will be explained to calculate the angular position of the body 21 in the scene 20 when the cursor is located by use of the controller 34 on the image of body 21 formed on the display device 32, this calculated position being delivered to a read-out 39 which may be an LED unit or may be integrated into display device 32 by overwriting.

By way of example consider the simple case of azimuthal rotation only with device 15 having a fixed 10° field of view and the line of sight 18 being orientated at 293° to North to encompass the scene 20 in which target 21 is located at the (unknown) position of 295° to North. The numbers 293° and 10° are identified by the sensors 24, 26 respectively and accordingly delivered to the computer 38 at the same time as the scene 20 is played back on the display device 32. The operator actuates controller 34 in order to superimpose the cursor on the image of target 21 appearing on display device 32. By virtue of the raster-scan of the imaging device 15 and the display device 32 being identical the displayed frame is accurately aligned and in registry with the imaged frame so that the mid-point of the displayed raster line is in alignment with the line of sight 18 and the cursor position is read out by the signalling circuit as being +20% of the line width displaced from the line mid-point. The computer then performs the calculation $$293° + 20\% \cdot 10°$$

to give a read-out of 295° as being the bearing of target 21.

It will now be evident that where elevational angles are concerned the computer likewise performs the computation $$E + Y\% \cdot F$$

where E is the elevation measurement provided by sensor 25,

F is the field of view angle provided by sensor 26, and

Y% is the deviation of the cursor in number of lines from the central line of the frame expressed as a percentage of the number of lines in the frame.

By virtue of the present invention the position of a body can be identified at a viewing station (i.e. station 12) which is remote from the data gathering station (i.e. station 11) with the data output of the latter integrated into a single signal. Accordingly in such applications as incorporate a periscope the space utilised for signal transmission to the viewing station 12 is minimised and data acquisition can be achieved without slip rings. Furthermore, data analysis need not be carried out on a real-time basis if so desired because the means 30 for receiving the signal at the station 12 may incorporate a storage arrangement such as magnetic tape. Furthermore the device 32 may be provided with a frame-hold facility in order continuously to display a single frame to facilitate accurate analysis thereof by critical location of the cursor thereon. In a further arrangement the delivering means 28 may comprise a recordal and storage medium such as magnetic tape and a transport mechanism for that medium between the two stations 11, 12.

In a further modification the angular subtense of the target 21 may be measured, and therefore a range estimation made where the target 21 is of known dimension, by measuring the position of two separate features of the target 21. This can either be achieved consecutively by a single cursor or simultaneously by two cursors.

What is claimed is:

1. Apparatus for identifying the position of a body relative to a datum comprising a first station at which there is located a raster-scan imaging device having a field of view with at least one degree of rotational freedom, sensor means for measuring the angular position of the device with respect to said datum, a signal processor for adding the output of the sensor means to the video signal delivered by the imaging device at a position in the raster-scan which, in playback, does not obscure the video picture generated by the device from radiation received by its field of view, and means for delivering the output of the signal processor to a second station;

and said second station comprises means for receiving the output of the signal processor and extracting therefrom the output of the sensor means as a measure of the angular position of the imaging device with respect to said datum, a raster-scan playback display device with means for providing an operator-controllable electronic cursor thereon, signalling means for identifying the cursor position with respect to the raster-scan of the playback device, and a calculating means for calculating from the measure of the imaging device angular position with respect to the datum and from the identified position of the cursor with respect to the raster-scan the angular position relative to said datum of a body which is identified in the field of view by location of the cursor on the playback display device.

2. Apparatus as claimed in claim 1, wherein the imaging device is provided with means for varying the sensitivity settings thereof and said sensor means also measures said sensitivity settings.

3. Apparatus as claimed in claim 1, wherein said first and second stations operate synchronously in time.

4. Apparatus as claimed in claim 1, wherein said first and second stations operate asynchronously in time.

* * * * *